United States Patent [19]

Tanaka et al.

[11] Patent Number: 5,112,416
[45] Date of Patent: May 12, 1992

[54] ALUMINUM BASED ALLOY BEARING HAVING STRENGTHENED INTERMEDIATE BONDING LAYER

[75] Inventors: Tadashi Tanaka, Konan; Masaaki Sakamoto, Nagoya; Yoshiaki Sato, Gifu; Tohru Kato, Seto, all of Japan

[73] Assignee: Daido Metal Company Ltd., Tokyo, Japan

[21] Appl. No.: 611,595

[22] Filed: Nov. 13, 1990

[30] Foreign Application Priority Data

Nov. 27, 1989 [JP] Japan ................................ 1-307342

[51] Int. Cl.$^5$ .................. C22C 21/00; B32B 15/10
[52] U.S. Cl. ................................. 148/437; 148/2; 148/11.5 A; 384/912; 420/528; 428/654; 428/926
[58] Field of Search .................. 148/437, 2, 11.5 A; 428/650, 653, 654, 926; 420/528, 529, 540, 542, 548; 384/912

[56] References Cited

FOREIGN PATENT DOCUMENTS

| | | | |
|---|---|---|---|
| 55-011182 | 1/1980 | Japan | 428/654 |
| 62-14024 | 3/1987 | Japan . | |
| 1275431 | 5/1972 | United Kingdom . | |
| 1365354 | 9/1974 | United Kingdom . | |
| 1577059 | 10/1980 | United Kingdom . | |

*Primary Examiner*—R. Dean
*Assistant Examiner*—Robert R. Koehler
*Attorney, Agent, or Firm*—Browdy and Neimark

[57] ABSTRACT

Disclosed is an aluminum based alloy bearing having a strengthened intermediate bonding layer, which comprises a backing steel, an intermediate bonding layer and an aluminum based bearing alloy layer. In this alloy bearing, the intermediate bonding layer has a hardness ranging from 40% to 70% of that of the aluminum based bearing alloy layer in terms of Vicker's hardness.

9 Claims, No Drawings

ALUMINUM BASED ALLOY BEARING HAVING STRENGTHENED INTERMEDIATE BONDING LAYER

BACKGROUND OF THE INVENTION

This invention relates to an aluminum based alloy bearing having a strengthened intermediate bonding layer, which exhibits a high fatigue strength and conformability with the surface of a rotary shaft when used for high output engines of automobiles and ordinary industrial machine.

STATEMENT OF THE RELATED ART

As conventional aluminium-based bearing alloys for high load engines there have been known Al-Sn alloys, Al-Sn-Si alloys, and Al-Zn alloys, which are disclosed in, for example, Japanese Patent Examined Publications Nos. 52-12131, 62-14024, and 57-14742. Each of these materials is bonded to a steel sheet directly or through a Ni-plated layer, pure aluminum layer, or aluminum alloy layer of low hardness (for example, 20 Hv or less) disposed therebetween as an intermediate bonding layer, thereby forming a bearing.

With a recent increase in load of the engines, the above-mentioned aluminum-based bearing alloys have been being improved into ones having higher fatigue strength and higher hardness (for example, a hardness of 50 Hv or less). However, such bearing alloys still involve the following problems though rarely.

(a) Firstly, the bearing which has been prepared by directly bonding a steel sheet and a bearing alloy together, or by bonding the two through a Ni plated layer provided therebetween as an intermediate bonding layer, has poor conformability with a shaft on account of the hardness of its alloy used. Consequently, in a case where these bearing are applied on the shaft having misalignment or heading motion, they tend to fatigue earlier.

(b) In a case of the bearing prepared by bonding a steel sheet and the bearing alloy to each other through a pure aluminum layer or through an aluminum alloy layer having a low hardness (for example, 20 Hv or less), when such bearing is used under a high load, main components of the bearing alloy are diffused into the intermediate layer of low hardness to gather near a boundary region between the backing steel and the intermediate alloy layer. In consequence, the backing steel becomes apt to exfoliate from the intermediate alloy layer at such boundary region.

(c) In a case of the bearing prepared by bonding a steel sheet and the bearing alloy to each other through the pure aluminum layer or through the aluminum alloy layer of low hardness (for example, 20 Hv or less), when such bearing is used under a high load, this intermediate layer is plastically deformed because of its low hardness to protrude or come out from the end face of the bearing.

SUMMARY OF THE INVENTION

In view of the above, an object of the present invention is to provide an aluminum-based alloy bearing having a strengthened intermediate bonding layer, which has been improved in respect of the drawbacks inherent in the conventional techniques.

To attain the above object, according to one aspect of the present invention, there is provided a first aluminum based alloy bearing having a strengthened intermediate bonding layer, the aluminum based alloy bearing comprising a backing steel, an intermediate bonding layer, and an aluminum based bearing alloy layer, the intermediate bonding layer having a hardness ranging from 40% to 70% of that of the aluminum based bearing alloy layer in terms of Vicker's hardness.

Further, according to another aspect of the present invention, there is provided a second aluminum based alloy bearing having a strengthened intermediate bonding layer, the aluminum based alloy bearing comprising a backing steel, an intermediate bonding layer, and an aluminum based bearing alloy layer, the intermediate bonding layer having a hardness ranging from 40% to 70% of that of the aluminum based bearing alloy layer in terms of Vicker's hardness and the aluminum based bearing alloy layer having a hardness of not less than 50 in terms of Vicker's hardness.

Further, according to still another aspect of the present invention, there is provided a third aluminum based alloy bearing having a strengthened intermediate bonding layer, the aluminum based alloy bearing comprising a backing steel, an intermediate bonding layer and an aluminum based bearing alloy layer, the intermediate bonding layer having a hardness ranging from 40% to 70% of that of the aluminum based bearing alloy in terms of Vicker's hardness, the intermediate bonding layer having a hardness of not less than 25 in terms of Vicker's hardness, and the aluminum based bearing alloy having a hardness of not less than 50 in terms of Vicker's hardness.

The intermediate bonding layer preferably consists, by weight, of at least one kind of 0.3 to 5% selected from the group consisting of Mn, Cu, Zn, Si, and Mg, and the balance Al and incidental impurities.

The aluminum based bearing alloy layer of the bearing product preferably has a thickness of 0.2 to 1.0 mm and is produced through a casting process and rolling process.

The hardness of the intermediate bonding layer preferably is in the range of 50 to 65% of that of the aluminum based bearing alloy.

Next, the reasons why the hardness of the intermediate bonding layer of the aluminum based alloy bearing having a strengthened intermediate bonding layer ranges from 40% to 70% of that of the aluminum based bearing alloy will be described below.

(a) Where the hardness of the intermediate bonding layer is lower than 40% of the aluminum based bearing alloy in terms of Vicker's hardness, the use of the bearing under severe conditions causes the main components of the aluminum based bearing alloy to be diffused into the intermediate bonding layer, or causes the intermediate bonding layer per se to be deformed to locally protrude or come out from the end faces of the bearing. However, the hardness of the intermediate bonding layer should be at least 25 in terms of Vicker's hardness. On the other hand, in a case where hardness of the intermediate bonding layer is higher than 70% of the aluminum based bearing alloy in terms of Vicker's hardness, the intermediate bonding layer fails to serve as a cushion, so that the bearing comes to have degraded conformability.

(b) In a case where the aluminum based bearing alloy is one whose Vicker's hardness is below 50, fatigue thereof occurs under high-load conditions in which the present bearing is intended to be used.

(c) The elements used for strengthening the intermediate bonding layer may be Mn, Cu, Zn, Si and Mg each of which forms a solid solution with Al matrix, or is crystallized or precipitated but does not produce any coarse grain compound. In this case, however, it is effective to add at least one kind selected from the group consisting of Mn, Cu, Zn, Si, and Mg. In a case where the addition of the selected element is not more than 0.3% in contents, no effect can be obtained from that addition. On the other hand, in a case where the addition thereof exceeds 5% in contents, the bearing becomes excessively hard.

DESCRIPTION OF THE PREFERRED EMBODIMENT

The invention will be more fully understood from examples described below.

EXAMPLE

Aluminum based bearing alloy sheets, and aluminum alloy sheets for use as the intermediate bonding layers, both being showing in Table 1, were prepared from ordinary casting and rolling. Next, each aluminum alloy sheet for use as the intermediate bonding layer was superposed upon the aluminum based bearing alloy sheet and then both were roll-bonded together under pressure to thereby form a composite aluminum sheet. A steel strip having a low carbon content (of 0.04 to 0.35% by weight), which becomes a backing steel of the bearing, was superposed upon the composite aluminum plates at the side of the aluminum alloy sheet for the intermediate bonding layer. Then, both were roll-bonded together at a reduction rate of 35 to 50%, thus obtaining an aluminum based alloy bearing material. This bearing material was worked to obtain a half bearing. At this time, the thickness of the intermediate bonding layer was in the range of 0.02 to 0.12 mm while the thickness of the backing steel was in the range of 1.17 to 1.23 mm. The thickness of the bearing material was 1.5 mm. The hardness test, and the fatigue test and locally non-uniform high pressure contact fatigue strength test (the conditions for the latter two tests are shown in Tables 2 and 3) were conducted on the bearings thus obtained, the results being shown in Table 1.

For comparison with the bearing samples of the present invention, various comparative bearing samples were prepared under the same conditions as those for preparation of the bearing samples of the present invention. However, in the case of comparative bearing samples whose intermediate bonding layers are Ni, a Ni-plated layer was provided on a steel sheet and then this Ni-plated layer is pressure bonded to an aluminum based bearing alloy, thus preparing comparative bearing samples having the Ni-plated layer of 2 to 4 μm. In the case of comparative bearing samples having no intermediate bonding layer, bearing alloys were directly bonded to steel sheet, thus preparing comparative bearing samples.

The locally non-uniform high pressure contact fatigue strength tests under the conditions shown in Table 3 were conducted in a state wherein the bearing and a shaft were in an extremely non-uniform high pressure contact with each other. On the other hand, the fatigue tests under the conditions shown in Table 2 were conducted with the bearings being in uniform contact with a shaft.

In analyzing the results of the fatigue tests in Table 1, in the case of the comparative bearing samples Nos. 1–3 whose aluminum based bearing alloys and intermediate bonding layers have respectively hardness less than 50 Hv and less than 25 Hv, there occurred fatigue with even the bearing having intermediate bonding layers. Further, the comparative bearing samples (No. 4 and No. 8) whose intermediate bonding layers are made of soft aluminum although the aluminum based bearing alloys per se have a hardness of 50 Hv or more exhibited the following phenomena. That is, the main components of the aluminum bearing alloy were diffused into the intermediate bonding layer and thus gathered at the boundary portion between the intermediate bonding layer and the steel backing. As a result, unusual exfoliation took place, or the intermediate bonding layer was plastically deformed to protrude from the end faces of the bearing involved. In a case of a comparative bearing sample such as the comparative bearing example No. 7 having no intermediate bonding layer, the bonding strength between the steel backing and the aluminum based bearing alloy was insufficient. From these experimental results, it has been found that the bearing structure having an intermediate bonding layer of low hardness can not withstand actual usage conditions under a high load. Further, according to the results of the locally non-uniform high pressure contact fatigue strength tests, fatigue phenomena took place on the comparative bearing samples (Nos. 2, 5 and 9) having the Ni plated layer as the intermediate bonding layer, on the comparative bearing samples (Nos. 3, 6 and 10) using an aluminum alloy of high hardness as the intermediate bonding layer, and on the comparative bearing samples (Nos. 7 and 11) having no intermediate bonding layer. Conversely, in the comparative bearing samples (Nos. 1, 4 and 8) which have a soft aluminum as the intermediate bonding layer these occurred no fatigue. This is because this soft intermediate layer serves as a cushion and the resulting bearing has confermability with a shaft.

In each of the bearing samples Nos. 12 to 15 of the present invention there was provided an intermediate bonding layer between the aluminum based bearing alloy having a high hardness of not less than 50 Hv and the steel backing which intermediate bonding layer had a balanced hardness (which is made of aluminum alloy having a hardness of 40% to 70% of the Vicker's hardness of the aluminum based bearing alloy), so that good results are obtained both in the fatigue tests and in the locally non-uniform high pressure fatigue strength tests. This is because the aluminum based alloy bearing samples according to the present invention have two balanced properties, i.e., to fatigue strength and conformability with the surface of a rotary shaft.

TABLE 1

| | | Aluminum-Based Bearing Alloy Components (wt %) | | | | | | Intermediate Bonding Layer | | | | | |
|---|---|---|---|---|---|---|---|---|---|---|---|---|---|
| | | | | | | | | Aluminum-Based Bearing Alloy Components (wt %) | | | | | Plated Layer on |
| No. | Al | Sn | Cu | Si | Pb | Zn | Mg | Al | Mn | Cu | Zn | Si | Mg | Steel Sheet |

TABLE 1-continued

|  | No. | | | | | | | | | | | | | | |
|---|---|---|---|---|---|---|---|---|---|---|---|---|---|---|---|
| Comparative Products | 1 | Rem. | 20 | 1 | — | — | — | — | Pure | — | — | — | — | — | Absence |
|  | 2 | " | " | " | — | — | — | — | — | — | — | — | — | — | Presence |
|  | 3 | " | " | " | — | — | — | — | Rem. | 1.5 | 0.1 | — | — | — | Absence |
|  | 4 | " | 10 | 2 | 3 | 1 | — | — | Pure | — | — | — | — | — | Absence |
|  | 5 | " | " | " | " | " | — | — | — | — | — | — | — | — | Presence |
|  | 6 | " | " | " | " | " | — | — | Rem. | — | 1.5 | — | 2 | — | Absence |
|  | 7 | " | " | " | " | " | — | — | — | — | — | — | — | — | Absence |
|  | 8 | " | — | 1 | 4 | 1 | 5 | 0.5 | Pure | — | — | — | — | — | Absence |
|  | 9 | " | — | " | " | " | " | " | — | — | — | — | — | — | Presence |
|  | 10 | " | — | " | " | " | " | " | Rem. | — | — | — | 2 | 1 | Absence |
|  | 11 | " | — | " | " | " | " | " | — | — | — | — | — | — | Absence |
| Products of the Invention | 12 | " | 10 | 2 | 3 | 1 | — | — | Rem. | 1.2 | 0.15 | — | — | — | Absence |
|  | 13 | " | " | " | " | " | — | — | " | — | 0.3 | — | 1 | 0.8 | Absence |
|  | 14 | " | — | 1 | 4 | 1 | 5 | 0.5 | " | — | 1 | 2 | 1 | — | Absence |
|  | 15 | " | — | " | " | " | " | " | " | — | 1.5 | — | — | — | Absence |

|  | No. | Hardness Hv 5 Aluminum-Based Bearing Alloy | Intermediate Aluminum Layer | (Intermediate Aluminum-Based Alloy Hardness) / (Aluminum-Based Bearing Alloy Hardness) × 100 (%) | Results of Fatigue Test | Results of Non-Uniform High Pressure Contact Fatigue Test |
|---|---|---|---|---|---|---|
| Comparative Products | 1 | 40.5 | 19.0 | 46.9 | X | ○ |
|  | 2 | " | — | — | X | X |
|  | 3 | " | 29.6 | 73.1 | X | X |
|  | 4 | 58.5 | 19.0 | 32.5 | X | ○ |
|  | 5 | " | — | — | ○ | X |
|  | 6 | " | 43.0 | 73.5 | ○ | X |
|  | 7 | " | — | — | X | X |
|  | 8 | 54.0 | 19.0 | 35.2 | X | ○ |
|  | 9 | " | — | — | ○ | X |
|  | 10 | " | 40.3 | 74.6 | ○ | X |
|  | 11 | " | — | — | ○ | X |
| Products of the Invention | 12 | 58.5 | 30.1 | 51.5 | ○ | ○ |
|  | 13 | " | 29.5 | 50.4 | ○ | ○ |
|  | 14 | 54.0 | 35.0 | 64.8 | ○ | ○ |
|  | 15 | " | 32.0 | 59.3 | ○ | ○ |

Note:
Decisions Marked ○ or X in the corresponding test-result columns to each sample are made as follows.
○: The tested bearing exhibited no abnormality even after completion of the test.
X: After the test, the bearing exhibited abnormalities such as fatigue, exfoliation, protrusion of intermediate bonding layer, etc.

TABLE 2

Testing Conditions
Fatigue Test

| Testing Machine | Sota Type Dynamic Load Testing Machine |
|---|---|
| Revolution Speed | 4,000 RPM |
| Testing Time | 20 Hrs. |
| Velocity | 11.1 m/sec. |
| Load on Bearing Surface | 400 Kg/cm² |
| Oil Inlet Temperature | 120° C. |
| Oil Supply Pressure | 3 Kg/cm² |
| Lubricating Oil | SAE 20 |
| Angle for Supply of Oil | Advanced Angle: 45° |

TABLE 3

Testing Conditions
Comparative Test on Locally Non-Uniform High Pressure Contact Fatigue Strength

| Testing Machine | Dai-Do Type Dynamic Load Testing Machine |
|---|---|
| Revolution Speed | 6,000 RPM |
| Testing Time | 20 Hrs. |
| Velocity | 16.6 m/sec. |
| Load on Bearing Surface | 225 Kg/cm² |
| Oil Inlet Temperature | 130° C. |
| Oil Supply Pressure | 1.5 Kg/cm² |
| Lubricating Oil | 10W30 |
| Angle for Supply of Oil | Advanced Angle: 45° |

The aluminum based alloy bearings according to the present invention simultaneously have both the excellent conformability and fatigue strength to thereby eliminate the drawbacks inherent in the bearings according to the prior art, so that they have high reliability as bearings for use in high-output engines.

What is claimed is:

1. An aluminum based ally bearing having a strengthened intermediate bonding layer, which consists of an aluminum based bearing, an intermediate bonding layer and a backing steel, said intermediate bonding layer having a hardness in a range of from 40% to 70% of that of said aluminum based bearing alloy layer in terms of Vicker's hardness, wherein said aluminum based bearing alloy layer has a thickness of 0.2 to 1.0 mm and is produced through a casting process and/or rolling process.

2. An aluminum based alloy bearing having a strengthened intermediate bonding layer according to claim 1, wherein said aluminum based bearing alloy layer has a hardness of not less than 50 in terms of Vicker's hardness.

3. An aluminum based alloy bearing having a strengthened intermediate bonding layer according to claim 1, wherein said intermediate bonding layer has a hardness of not less than 25 in terms of Vicker's hardness.

4. An aluminum based alloy bearing having a strengthened intermediate bonding layer according to claim 1, wherein said intermediate bonding layer consists, by weight, of at least one kind of 0.3 to 5% selected from the group consisting of Mn, Cu, Zn, Si and Mg, and the balance Al and incidental impurities.

5. An aluminum based alloy bearing having a strengthening intermediate bonding layer according to claim 2, wherein said intermediate bonding layer has a hardness of not less than 25 in terms of Vicker's hardness.

6. An aluminum based alloy bearing having a strengthened intermediate bonding layer, which consists of an aluminum based bearing, an intermediate bonding layer and a backing steel, said intermediate bonding layer having a hardness in a range of from 40% to 70% of that of said aluminum based bearing alloy layer in terms of Vicker's hardness, wherein said intermediate bonding layer consists, by weight, of at least one kind of 0.3 to 5% selected from the group consisting of Mn, Cu, Zn, Si and Mg, and the balance Al and incidental impurities.

7. An aluminum based alloy bearing having a strengthened intermediate bonding layer according to claim 6, wherein said aluminum based bearing alloy layer has a hardness of not less than 50 in terms of Vicker's hardness.

8. An aluminum based alloy bearing having a strengthened intermediate bonding layer according to claim 6 wherein said intermediate bonding layer has a hardness of not less than 25 in terms of Vicker's hardness.

9. An aluminum based alloy bearing having a strengthened intermediate bonding layer according to claim 7, wherein said intermediate bonding layer has a hardness of not less than 25 in terms of Vicker's hardness.

* * * * *